United States Patent
Downey et al.

[15] 3,641,896
[45] Feb. 15, 1972

[54] MOTION PICTURE FILM CASSETTE-PROCESSOR SYSTEM

[72] Inventors: Rogers B. Downey, Lexington; Paul W. Thomas, Duxbury, both of Mass.

[73] Assignee: Polaroid Corporation, Cambridge, Mass.

[22] Filed: Apr. 4, 1969

[21] Appl. No.: 813,586

[52] U.S. Cl. ............................95/13, 95/89 R, 95/90 S, 95/94, 352/78, 352/130, 222/511, 222/559
[51] Int. Cl. .........................................G03b 17/50
[58] Field of Search..........................95/13, 14, 89, 90.5, 94; 352/78, 130; 222/511, 559, 561

[56] References Cited

UNITED STATES PATENTS

| | | | |
|---|---|---|---|
| 2,435,719 | 2/1948 | Land | 95/13 |
| 2,520,641 | 8/1950 | Land | 95/13 |
| 2,626,089 | 1/1953 | Osfar | 222/511 |
| 2,966,103 | 12/1960 | Erikson | 95/13 |
| 2,981,170 | 4/1961 | Brault | 95/89 |
| 3,194,138 | 7/1965 | Land | 95/13 |
| 3,383,998 | 5/1968 | Takats | 95/90.5 |
| 3,498,203 | 3/1970 | Chen | 95/89 |

*Primary Examiner*—Samuel S. Matthews
*Assistant Examiner*—Richard M. Sheer
*Attorney*—Brown and Mikulka, William D. Roberson and Robert L. Berger

[57] ABSTRACT

An applicator system including a dispensing container having a reservoir chamber for retaining processing fluid and an orifice provided therethrough communicating with the reservoir chamber. A strip of flexible material having an opening provided therein and a cleaning pad mounted adjacent that opening is disposed over the aforesaid orifice and connected to an actuator slidably mounted in guide tracks of the container's housing whereby the opening in the flexible material may be brought into and removed from alignment with the orifice. A mechanism is provided to progressively draw a strip of exposed photographic material across the container's orifice in intermediate spaced-apart relationship to the strip of flexible material and a spring mounted support plate when the orifice is sealed by the flexible material. The support plate automatically slidably engages the filmstrip against the flexible material whenever the actuator is displaced into a position where the opening through that material is in alignment with the orifice. In this position the filmstrip engages the cleaning pad immediately before being coated with processing fluid expressed from the orifice. This system can most advantageously be employed in a compact multipurpose film-handling cassette adapted to be first mounted in a camera to facilitate exposure operations and then subsequently in a unique processor-projector unit.

47 Claims, 9 Drawing Figures

INVENTORS
ROGERS B. DOWNEY
PAUL W. THOMAS
BY Brown and Mikulka
and
Robert L. Berger
ATTORNEYS

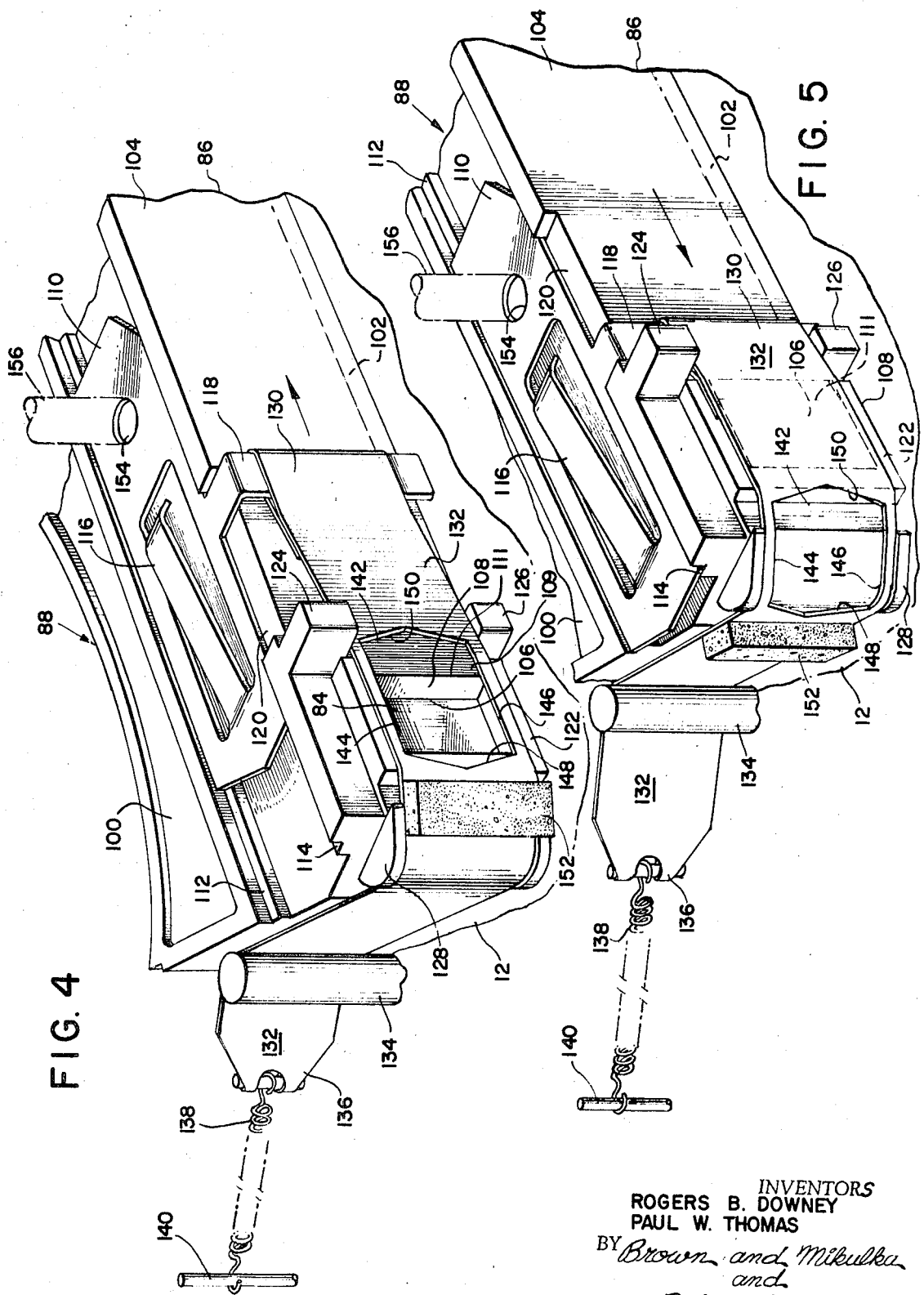

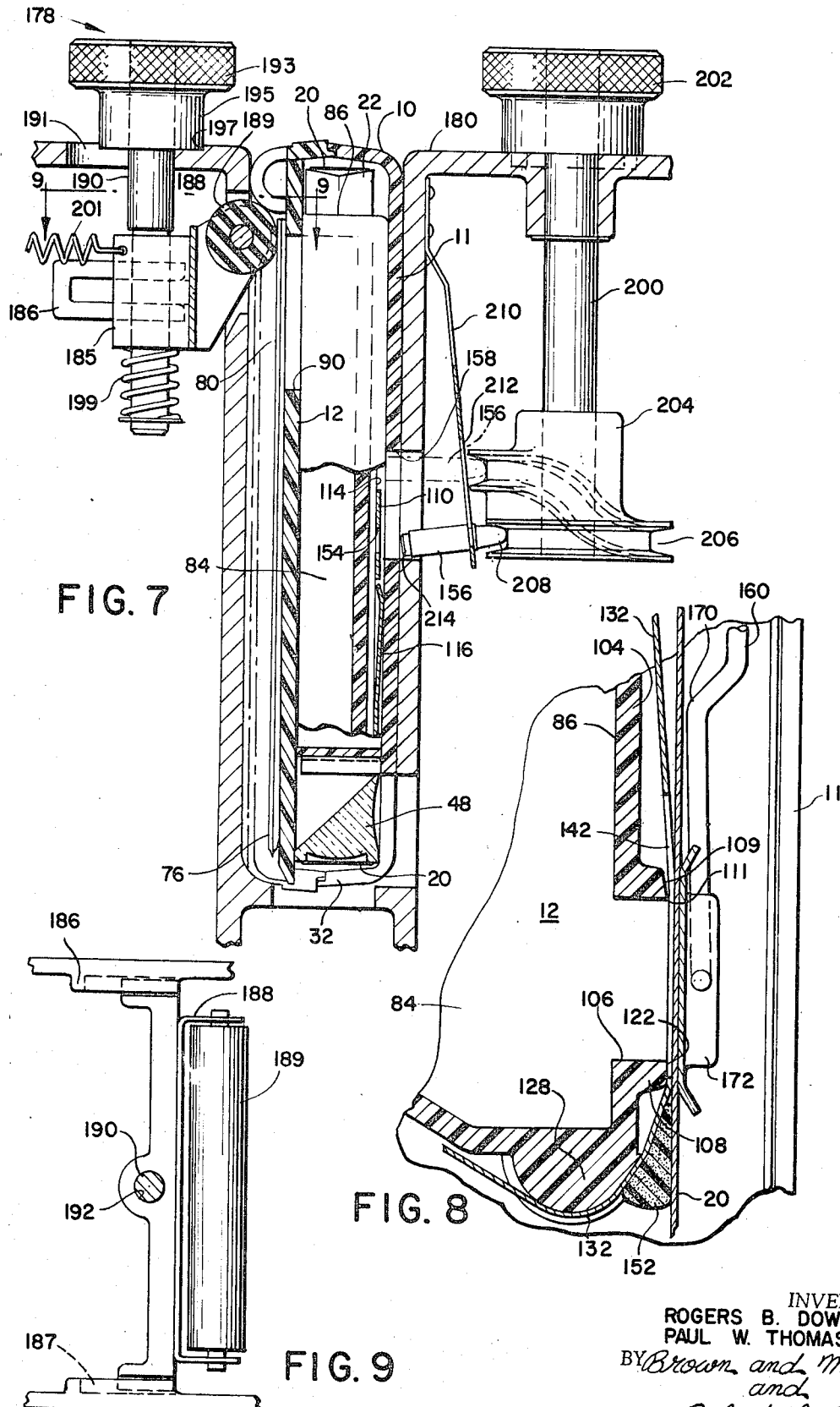

MOTION PICTURE FILM CASSETTE-PROCESSOR SYSTEM

BACKGROUND OF THE INVENTION

1. Field of Invention

This invention relates to photography and, more particularly, to an improved system for applying a uniform coating of processing fluid to an exposed strip of photographic material.

2. Description of the Prior Art

After motion picture film has been exposed in a camera, it has generally been the practice for the photographer to mail the reel of exposed film to a processing laboratory. At the laboratory the film is removed from the reel and subjected to a series of operations in order to develop visible images from the images recorded thereon during the exposure operations. The fully developed film strip is then rewound onto a reel at the laboratory and returned to the user.

The extended delay normally incurred between the time exposed film is mailed to the laboratory and returned ready for viewing has proved to be a significant inconvenience to the user and a source of great annoyance.

The field of still photography is no longer hampered by extensive periods of delay associated with the processing of exposed film. The impact on the public of the one-step photographic process employing diffusion transfer techniques is a matter of record and generally well known. The home still photographer can now enjoy the fruits of his efforts in a matter of seconds. This important convenience has been available to the amateur still photographer for many years.

Most recently, important technological advances have made it possible for the home photographer interested in motion pictures to enjoy this same convenience. Radically different systems have now been developed which permit the photographer himself to quickly and easily process and project a strip of motion picture film shortly after the pictures have been taken. Exemplary of such new and unique systems are those described in copending applications Ser. No. 755,901 of Edwin H. Land filed Aug. 28, 1968; Ser. No. 761,771 of Rogers B. Downey filed Sept. 23, 1968; Ser. No. 776,481 of Rogers B. Downey filed Nov. 18, 1968; Ser. No. 772,789 of Vaito K. Eloranta and Benjamin C. Ruggles filed Nov. 1, 1968; Ser. No. 788,897 of Rogers B. Downey filed Jan. 3, 1969; Ser. No. 813,427 of Rogers B. Downey filed Apr. 4, 1969 and Ser. No. 813,469 of Rogers B. Downey filed Apr. 4, 1969; all of which applications are assigned to the assignee of the present invention. Each of the systems described in the aforementioned copending applications most advantageously employ a cassette from which the film need not be removed during exposure, processing and projection operations.

In commercial and industrial operations, such rapid motion picture processing systems are not only an improvement as a matter of convenience, but have other important effects as well. For instance, motion picture newsreel programs can be presented on television to the viewing public shortly after events of interest have occurred and been photographed.

In some of these new systems the processing fluid is initially stored in a dispensing container having an applicator, in some the processing fluid is initially stored in a frangible container from which it is later released into a reservoir of the cassette to facilitate the processing operation, while in still others the processing fluid is initially stored in a rupturable pod from which it can be expelled into an applicator at the proper time. Considerable funds and effort are currently being expended to further improve and refine various features of these systems in order to reduce their cost, to further simplify the task of the operator, to improve their reliability, and to improve the quality of the final product. The present invention is directed to an improved system of the type in which a dispensing container is provided with a reservoir chamber adapted to receive the processing fluid and from which it may be expressed through an orifice onto the exposed film strip and which, further, is particularly well suited for use in a compact multipurpose film handling cassette wherein the processing fluid is initially retained in a rupturable pod. Importantly, this improved system is capable of being operated by the photographer himself.

In operations of this general type, it is highly desirable to effectively control the flow of processing fluid from the applicator system so as to prevent premature leakage of the fluid and/or leakage after the exposed areas of the film strip have been treated. Obviously, premature leakage of the processing fluid can result in a situation in which sufficient processing fluid is not later available for the film processing operation itself. Additionally, any type of leakage adversely affects the cost of the operation and results in undesirable fouling of various parts of the system. It is also desirable in systems of this type that the surface of the exposed film strip be free of foreign matter at the time the processing fluid is applied thereto.

In order to improve and maintain the quality of the processed film strip, it has been the practice to bring the film strip into contact with an applicator only at such time as the processing fluid is being applied thereto. However, prior art techniques for effecting such an arrangement have functioned independently of other system operations, resulting not only in increased system costs but also in a more involved procedure for the operator to follow.

One of the objects of this invention, therefore, is to provide an improved system for applying a processing fluid to a strip of exposed photographic material.

Another primary object of this invention is to provide relatively inexpensive and an extremely effective means for selectively sealing and unsealing an orifice of an applicator system.

A further object of this invention is to provide an improved system for selectively unsealing an orifice of an applicator system and simultaneously displacing a strip of exposed photographic material into operative relationship with that orifice.

An additional object of this invention is to provide a system for automatically displacing a strip of exposed photographic material into operative relationship with an orifice of an applicator system whenever that orifice is in an unsealed condition.

Still another object of this invention is to provide an improved system for selectively effecting an operable relationship between a source of processing fluid and a strip of exposed photographic material.

Also, an object of this invention is to provide an improved system for removing foreign material from a strip of exposed photographic material immediately prior to treating that strip of material with processing fluid.

A still further object of this invention is to provide a compact multipurpose motion picture film handling cassette employing an improved system for selectively sealing and unsealing the orifice of an applicator system thereof.

Another object of this invention is to provide a compact multipurpose motion picture film handling cassette employing an improved system for selectively effecting an operable relationship between a strip of exposed photographic material and a source of processing fluid.

An additional object of this invention is to provide a compact motion picture film handling cassette which contains an improved system for obtaining and maintaining a high quality, fully processed strip of photographic material.

Still an additional object of this invention is to provide an improved processor or processor-projector unit for use in connection with cassettes of the type indicated.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will be best understood from the following description of the preferred embodiment when read in connection with the accompanying drawings wherein like numbers have been employed in the different figures to denote the same parts and wherein:

FIG. 4 is a diagrammatic perspective view of the applicator system employed in the cassette shown in FIG. 1 embodying features of this invention and, further, showing the actuator of that system in its position when the system's orifice is in an unsealed condition;

FIG. 5 is a diagrammatic perspective view similar to FIG. 4 except illustrating the actuator in its position when the system's orifice is in a sealed condition;

FIG. 7 is a partial vertical sectional view illustrating the cooperating elements of the cassette and the processor-projecting unit for selectively rendering the cassette's applicator system operable;

FIG. 8 is an enlarged partial sectional view illustrating certain details of the applicator system of this invention taken along line 8—8 of FIG. 3; and FIG. 9 is a view illustrating the pod rupturing means of the processor-projector unit taken along line 9—9 of FIG. 7.

SUMMARY OF THE INVENTION

Figure 1:
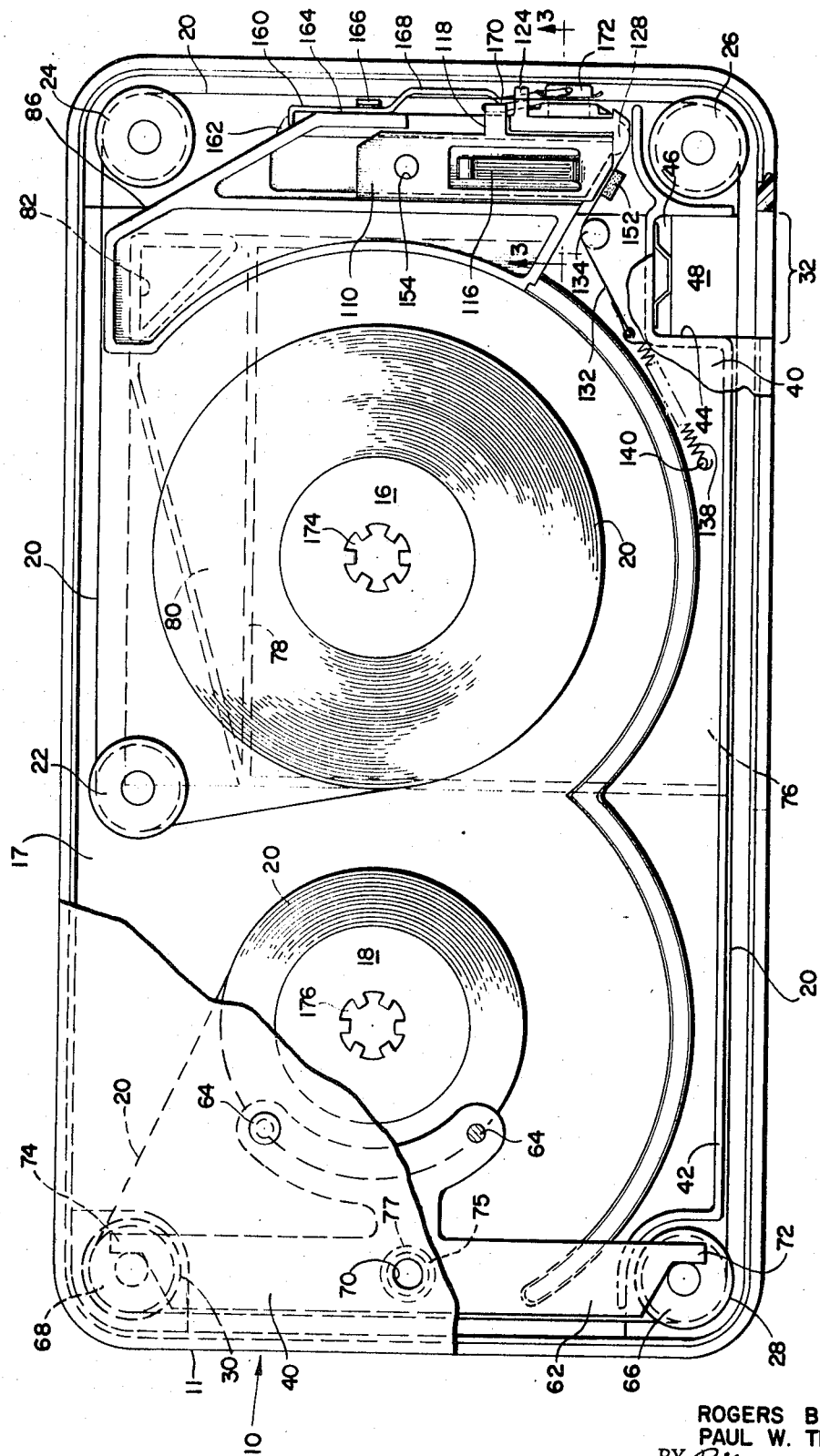
FIG. 1 is a diagrammatic cut away plan view of a compact multipurpose motion picture film handling cassette embodying features of this invention.

A preferred embodiment of this invention briefly comprises an applicator system including a pair of opposed parallel walls with a sidewall formed therebetween around the peripheries thereof to define a reservoir chamber in which a body of processing fluid may be disposed. An orifice communicating with this reservoir chamber is provided through the sidewall and a projection extends from the sidewall adjacent the edges of that orifice. An actuator member is slidably disposed in guide tracks formed in the outer face of one of the opposed walls and includes a tang which extends over the sidewall and spaced apart therefrom a distance less than is the end face of the aforesaid projection.

A strip of flexible material has one of its ends connected to the actuator's prong and extends therefrom so as to seat against the end face of the projection, its other end being connected to a support member by a spring. This strip of flexible material is provided with an opening located therein so as to be positioned out of registry with the aforesaid orifice when the actuator is disposed in a first position along the guide tracks under the force of the spring acting through the flexible material, and so as to be in registry with the orifice when the actuator is displaced to a second position against the force of that spring. A cleaning pad is mounted on the strip of flexible material adjacent the opening provided therein on the other side of the opening from the end of the flexible material attached to the actuator's prong.

A support plate is mounted from the applicator housing by a spring member so as to be in alignment with the applicator's orifice and spaced from the strip of flexible material when the orifice is sealed by that material. This initial spaced-apart relationship between the support plate and the flexible material is effected by the actuator's prong being in contact with the spring to which the support plate is connected. The strip of photographic material to be treated with processing fluid from the reservoir chamber is initially positioned intermediate the support plate and the flexible material and in spaced relationship to both of these elements. The spring member is uniquely configured such that as the actuator is displaced to its position wherein the opening in the resilient material has been drawn into alignment with the applicator system's orifice, the actuator's prong has been disengaged from the spring so that the inherent force of the spring brings the support plate into contact with the film strip and slidably engages the film strip against the flexible material over the opening provided therein. Guide means are provided for the strip of flexible material such that when the support plate seats the film strip against the flexible material, the cleaning pad attached to the flexible material is automatically brought into contact with the film strip. In this condition, processing fluid from the reservoir chamber flows through the applicator system's orifice and the opening in the strip of the flexible material onto the exposed film strip. As the exposed film strip is then subsequently passed across the orifice, it draws processing fluid therefrom to form a uniform fluid coating therealong. Immediately prior to coming into contact with the processing fluid, any foreign matter on the film strip is removed by the pad mounted on the strip of flexible material.

Most advantageously, this unique system for applying processing fluid to a strip of exposed photographic material may be incorporated into a compact multipurpose motion picture film handling cassette. Such a film handling cassette may include a rupturable pod which communicates with the applicator system's reservoir chamber and in which the processing fluid is initially stored. The collapsible pod is located adjacent a removable cover plate of the cassette's housing whereby that plate may be selectively removed to expose this pod to an externally mounted force applying member. Substantially the entire length of the unexposed photographic film strip is initially coiled around a supply reel of the cassette and, in reaching a takeup reel of the cassette, passes through a processing station and an exposure and projection station. The applicator system's orifice is positioned in the processing station in an initially sealed condition and the exposure and projection station includes a film gate behind which a light-reflecting element is positioned with the film strip being disposed intermediate of the film gate and the reflecting element.

This cassette is adapted to be first mounted in a camera for exposure operations. During these operations, the processing station is inoperative and the photosensitive film strip is progressively drawn across the film gate onto the takeup reel. After the picture taking process has been completed, the cassette may be withdrawn from the camera, its aforesaid cover plate removed, and inserted into a specially configured processor-projector unit. A pressure applying assembly is mounted within the processor-projector unit and may take the form of a roller adapted to progressively engage the collapsible pod as the cassette is inserted into the unit. Consequently, by inserting the cassette into the processor-projector unit, the processing fluid initially contained in the collapsible container is automatically expelled therefrom into the reservoir chamber of the applicator system.

The processor-projector unit also includes means for engaging the actuator member of the applicator system whereby the strip of flexible material may be selectively displaced between a position wherein it seals the applicator's orifice and a position where its opening is brought into alignment with that orifice. Consequently, once the cassette has been mounted in the processor-projector unit, the operator can displace the strip of flexible material into an unsealing relationship with the applicator system's orifice. Drive means of the processor-projector unit first engage the cassette's supply reel to return the exposed film strip from the takeup reel to the supply reel. During this operation, the exposed film strip passes across the orifice of the applicator system and draws processing fluid therefrom to form a uniform coating of the fluid along its entire exposed surface. After this operation has been completed, the operator may return the strip of flexible material into a sealing relationship with the orifice.

Drive means of the processor-projector unit engaging the cassette's takeup reel may then be energized to return the processed film strip across the cassette's film gate in front of the light reflecting element to the takeup reel for projection purposes.

DESCRIPTION OF THE PREFERRED EMBODIMENT

A preferred embodiment of this invention is illustrated as applying a compatible processing fluid to a film structure which comprises both a photosensitive image-recording layer and an image-receiving layer in which a visible image may be formed by image-forming substances transferred by diffusion from the photosensitive layer without necessitating the subsequent removal of the processed photosensitive layer. This highly desirable type of film structure is made possible by a developed negative image having low covering power.

In typical silver halide diffusion transfer-reversal processes for the production of black-and-white images, a silver halide developer and a silver halide solvent are applied in an aqueous alkaline solution to a photoexposed silver halide stratum or emulsion where they develop exposed silver halide to silver and react with unreduced silver halide to form a soluble silver complex. This complex, in order to form a positive print, is transferred and reduced to silver on a silver-receptive stratum upon which the silver halide stratum has been superimposed. It has generally been the practice, in the completion of this process, to separate the silver-receptive and silver halide strata in order to render the positive image visible, particularly when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver deposited upon it, in comparison with silver developed in the silver halide stratum, to possess very high covering power, i.e., capacity for a given mass of reduced silver. If the silver halide is in such a concentration as to give rise only when fully developed to a predetermined low-maximum density, and if the silver complex is reduced to silver in a vigorous silver precipitating environment, the resulting negative and positive images in superposition provide a composite that presents a good image for projection purposes as long as the images are carried on a light-transmitting support. Since the silver halide stratum and the silver receptive stratum need not be separated, a simplification of the overall silver halide diffusion transfer-reversal process is achieved.

A composite film assembly of this type as well as processing compositions for producing a stable black-and-white image which can be viewed by transmitted light without the necessity of removing the processed, negative image-containing photosensitive layer are shown in prior U.S. Pat. No. 2,861,885 of Edwin H. Land which issued on Nov. 25, 1958. Other composite film assemblies capable of producing photographic records which can be exhibited in full color without the necessity of removing the processed photosensitive layer are shown in prior U.S. patents of Edwin H. Land Nos. 2,726,154 issued Dec. 6, 1955 and 2,944,894 issued July 12, 1960. All of these prior patents are assigned to the assignee of the present invention.

However, it should be noted that the present invention is not directed to the chemistry by which visible images are formed in an exposed photosensitive material and/or formed in an image receiving stratum associated therewith. While an illustrated preferred embodiment of the invention is shown applying a compatible processing fluid to a film structure not requiring the removal of the photosensitive layer after visible image formation is completed, the invention itself is also applicable for use with other types of processing fluids and film structures.

The illustrated preferred embodiment of this invention may best be understood by first returning to FIGS. 1 and 3 of the drawings. As may be seen therein, a compact multipurpose film handling cassette 10 is basically constituted by a pair of frame members 11 and 12 connected together to form an enclosed opaque housing. The frame member 12 is provided with a recessed portion 13 and a removable cover plate 14 which in combination define an enclosed section 15 separated from a lighttight section 17 of the cassette 10.

Cut out portions of the frame members 11 and 12 define a film gate 32 through which image-carrying light rays may enter and/or leave the cassette 10. In this embodiment, the cassette is relatively flat and generally rectangular parallelepiped in configuration. A supply reel 16 and a takeup reel 18 are coplanarly mounted within section 17 of the cassette 10 for rotation about parallel axes. A strip of unexposed photographic material 20, of the type previously discussed and provided with leaders affixed to the supply reel 16 and the takeup reel 18, is initially substantially entirely coiled around the supply reel. In traveling from the supply reel 16 to the takeup reel 18, the strip of photographic material 20 sequentially passes around idlers 22,24,26,28 and 30. Advantageously, the idlers 26 and 28 are positioned in opposite corners or extremities of the cassette 10 and on the same side of the supply reel 16 and the takeup reel 18. Additionally, the idler 24 is advantageously positioned in the corner of the supply reel 16 from the takeup reel 18 and on the opposite side of both of those reels from the idlers 26 and 28. Mounted between the frame member 12 and the wall 40 of the frame member 11 is a light-sealing plate 42 which extends adjacent the film strip 20 from a position in the vicinity of idler 26 to within the vicinity of the idler 28. This light-sealing plate 42 is configured to seat along the edge of an opening 44 provided in the wall 40 adjacent the film gate 32 thereby cooperating with the frame member 12 to define a recess 46 within the cassette 10 sealed in a lighttight manner from that portion of the cassette 10 in which the reels 16 and 18 are contained. As will be explained in more detail, this recess 46 in conjunction with the film gate 32 is adapted to serve both as an exposure and projection station of the cassette 10 and preferably is positioned intermediate of the idlers 26 and 28 in the immediate vicinity if idler 26 adjacent the corner of the cassette 10 which that idler occupies.

Figure 2:
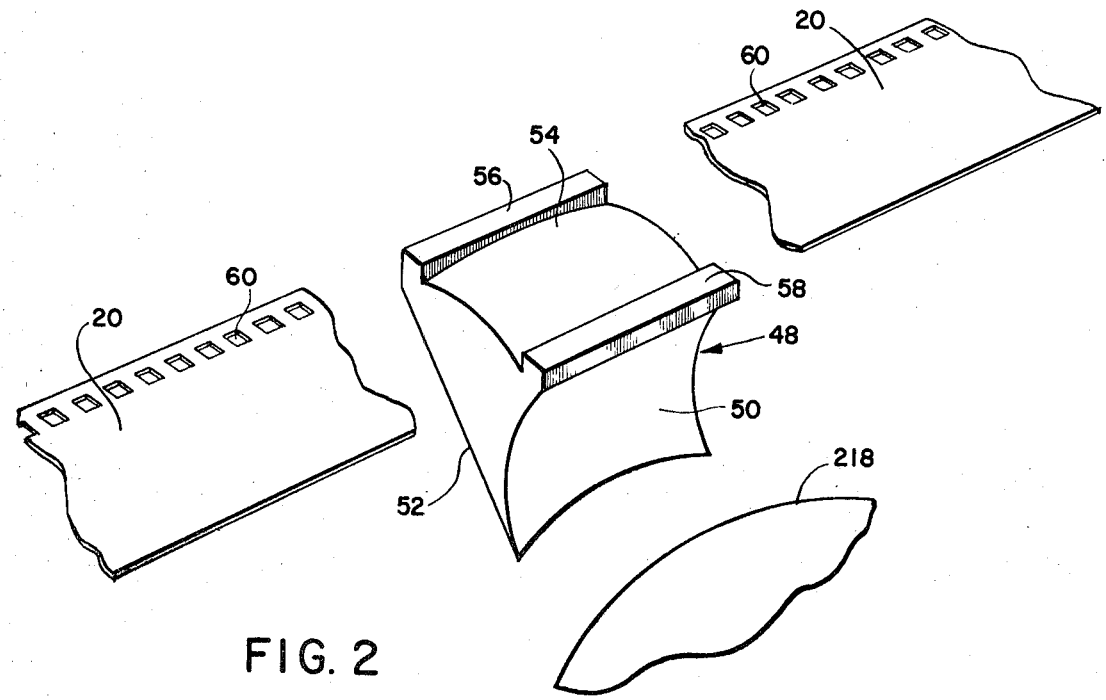
FIG. 2 is a diagrammatic perspective view, partially cut away, illustrating the light reflecting element and film strip employed in the cassette shown in FIG. 1 and also illustrating the operative relationship between the light-reflecting element and the light source of a projector.

Mounted by any suitable means within the recess 46 is a light-reflecting element 48. In the system illustrated in the drawings, this light-reflecting element 48 is prismatic in nature, as may be seen in FIG. 2, and includes a concave light receiving transparent face 50 and a flat reflecting surface 52 which reflects light received into the element through the concave face 50 outwardly through a convex transparent face 54 onto that portion of the film strip 20 disposed across the film gate 32. This light reflecting element 48 also includes a pair of parallel bearing surfaces 56 and 58 disposed on the opposite sides of its convex transparent face 54 and on which the film strip 20 is supported as it traverses the film gate 32. A prismatic element of this type suitable for use in connection with the present invention is described in copending application Ser. No. 767,609 of Herbert A. Bing filed Oct. 15, 1968 and assigned to the assignee of the present invention. As may be seen in FIG. 2 of the drawings, the film strip 20 includes sprocket holes 60 as is conventional.

Returning now to FIG. 1, it will be seen that a resilient member 62 is connected to the inside face of the wall 40 by any suitable means, such as rivets 64, and extends over and in spaced relationship to the end surfaces 66 and 68 of the idlers 28 and 30, respectively. Provided in the wall 40 is an aperture 70 disposed over the resilient member 62 whereby an externally mounted force applying member may be introduced into the cassette 10 to urge end portions 72 and 74 of that member 62 into frictional engagement with the idlers 28 and 30, respectively, so as to restrain further rotational movement of those idlers. In order to effectively light seal the interior of the cassette 10, a ring 75 is mounted on the resilient member 62 and adapted to seat in an annular recess 77 provided in the inside face of the wall 40 in coaxial alignment with the aperture 70. A snubbing arrangement of this type is described in the aforementioned copending application Ser. No. 813,427 of Rogers B. Downey, filed Apr. 4, 1969.

Figure 3:
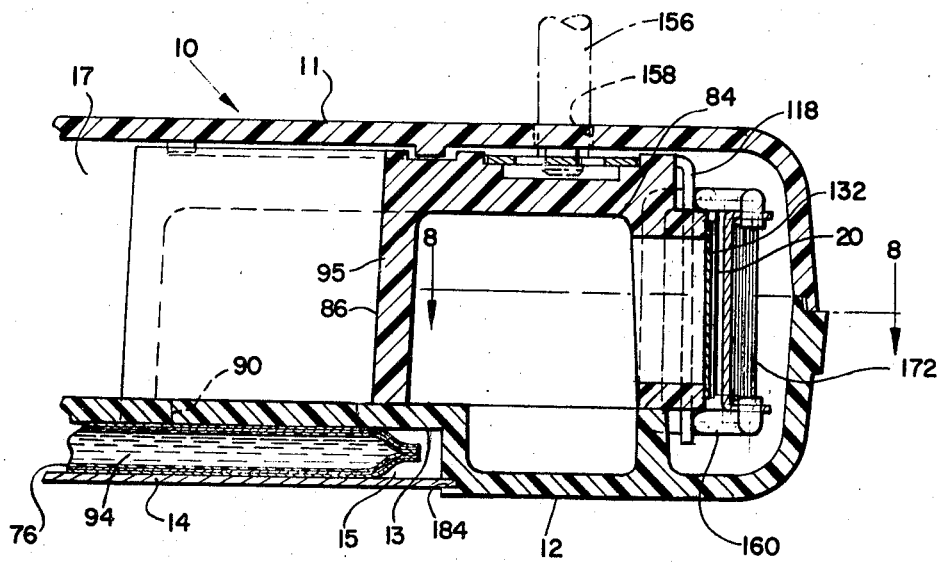
FIG. 3 is a partial vertical sectional view illustrating details of the applicator system employed in the cassette shown in FIG. 1 taken along line 3–3 of FIG. 1.

A rupturable pod or container 76 is positioned in the section 15 of the cassette 10 adjacent the frame member 12 (also see FIG. 3). This pod 76 includes a weakened seal 78 connected to a fluid feeding device 80 provided with an aperture 82. Advantageously, this assembly consisting of the rupturable pod 76 and fluid feeding device 80 may take the form of that described in aforementioned copending application Ser. No. 813,469 of Rogers B. Downey, filed Apr. 4, 1969. The fluid feeding device's aperture 82 communicates with a fluid reservoir chamber 84 of a dispensing container 86, forming part of an applicator system 88, through an opening 90 in the frame member 12. It has been found that approximately 2 cc. of processing fluid is sufficient to treat 50 feet of Super 8 format film; consequently, when the film strip 20 is of this type and length, approximately 2 cc. of processing fluid 94 is initially retained in the rupturable pod or container 76. Also, the capacity of the reservoir chamber 84 should be at least equal to that of the pod 76. It will be noted that in the illustrated preferred embodiment, the applicator system's dispensing container 86 is uniquely configured to make maximum utilization of the available space within section 17 of the cassette 10. In this respect, the dispensing container 86 is formed by bonding a housing member 95 to a specially configured section of the frame member 12. The surface of the fluid feeding device 80 around the periphery of its aperture 82 is bonded to the frame member 12 adjacent its opening 90.

As indicated, the rupturable pod 76 and fluid feeding device 80 are positioned within the recess 13 being attached to the frame member 12 by any suitable means. It will thus be appreciated that once the plate 14 has been removed, an exteriorly mounted force applying member may be drawn across the length of the pod 76 towards its weakened seal 78 and across the fluid feeding device 80 to initially rupture that seal and to cause the fluid 94 to be expelled from the pod through the fluid feeding device into the reservoir area 84 of the applicator system 88.

Details of the certain elements comprising the applicator system 88 are most clearly shown in FIGS. 4 and 5 of the drawings. In the preferred embodiment, the dispensing container 86 is basically formed by a pair of opposed parallel walls 100 and 102, the latter of which comprises a section of the frame member 12, connected together adjacent their peripheral edge surfaces by a sidewall 104. An orifice 106 is provided through the sidewall 104 and a rectangular projection 108 extends a short distance from the outside face of the sidewall 104 around the periphery of that orifice. A section 109 of the projection 108 is tapered so as to form a doctor blade 111. An actuator 110, preferably formed of a thin sheet of metal such as stainless steel, is slidably disposed between guide tracks 112 and 114 formed as a recessed portion of the outside face of the wall 100. Integrally formed as a part of the actuator 110 is a leaf spring 116 which is adapted to be contacted by the inside face of the cassette's wall 40 at the time the frame member 11 is assembled to the frame member 12. In this manner, the force of the leaf spring 116 firmly seats the actuator 110 in the guide tracks 112 and 114. This actuator 110 also includes a tang 118 which extends through a groove 120 in the housing member's sidewall 104 and which is disposed in spaced parallel relationship to the sidewall 104.

It is important to note that the tang 118 is positioned substantially closer to the outside face of the sidewall 104 than is the end face 122 of the rectangular projection 108. A pair of shoulders 124 and 126 extend from the outside face of the sidewall 104 intermediate of the projection 108 and the actuator's tang 118 and a guide member 128 extends from the outside face of the end wall 104 on the other side of the orifice 106 from shoulders 124 and 126. One end 130 of a strip of flexible material 132, which may, for example, be formed of a polymeric material such as "Mylar" manufactured by E. I. du Pont de Nemours and Co. of Wilmington, Delaware, or of a thin sheet of stainless steel, is connected to the actuator's tang 118. From the tang 118, this strip of flexible material 132 extends between the shoulders 124 and 126, over and against the projection 108 and around the guide member 128. In this respect, it also passes around a post 134 extending from the cassette's frame member 12 and its other end is connected to a spring 138 mounted from a pin 140 also extending from the cassette's frame member 12. It will be recognized that the frame member 12 including the pin 140 and the post 134 may, for example, be integrally formed from a suitable thermoplastic resin, such as an acrylic or polystyrene, in an inexpensive injection molding process. Similarly, the applicator system's housing member 95 including the shoulders 124 and 126, the projection 108, the guide member 128 and the guide tracks 112 and 114 may be formed in a similar injection molding process employing a polymeric material of the same type.

The strip of flexible material 132 is provided with an opening 142 which preferably includes a pair of parallel sides 144 and 146 connected by tapered sides 148 and 150, the purposes thereof to be subsequently explained. Mounted across the strip of flexible material 132 adjacent the tapered side 148 of the opening 142 is a cleaning pad 152. This pad 152 may be formed of any suitable material capable of removing foreign particles from the exposed emulsion surface of the film strip 20 without damaging the surface of the film strip when brought into contact therewith and relative motion is effected therebetween. For instance, it may be formed of cotton felting or of polyurethane foam.

As will be more fully explained hereinafter, processing fluid 94 from the reservoir chamber 84 is adapted to be expressed through the orifice 106 and the opening 142 in the flexible material 132 onto the film strip 20 as the film strip is progressively drawn across the orifice 106. During this operation, the strip of photographic material 20 is seated against the flexible material 132 and passes first across the cleaning pad 152, then across the orifice 106 and between the shoulders 124 and 126. In this respect, the shoulders 124 and 126 serve as guides for both the strip of flexible material 132 and the strip of photographic material 20. Consequently, the strip of material 132 is substantially the same width as the film strip 20 and the shoulders 124 and 126 are spaced substantially that same distance apart. The height of the orifice 106 (as viewed in FIGS. 4 and 5 of the drawings) is preferably the same dimension as the distance between the parallel sidewalls 144 and 146 of the opening 142 and this dimension is determined by the width of the surface of the strip of photographic material 20 to be treated with processing fluid 94.

It will now be noted that the actuator 110 also includes a circular aperture 154 adapted to receive an externally mounted pin 156 which may be inserted into the cassette 10 through an elongated slot 158 (see FIG. 3) provided through its wall 40. As shown in FIG. 5 the inherent force of the spring 138 connected to the strip of flexible material 132 causes the actuator 110 to be displaced into a position wherein its tang 118 is in its closest position along the groove 120 with respect to the orifice 106. At such time the orifice 106 is sealed by the portion of the strip of flexible material 132 which is seated against the end face 122 of the projection 108. Also at this time, the cleaning pad 152 is disposed out of the plane of that particular portion of the strip of flexible material 132. However, once that pin 156 has been inserted into the cassette 10 so as to seat in the actuator's recess 154, it may be displaced along the slot 158 to draw the actuator's tang 118, against the force of the spring 138, into the position shown in FIG. 4 of the drawings. It will be seen that, at such time, the opening 142 in the strip of flexible material 132 is in registry with the orifice 106 and, further, that the cleaning pad 152 has been displaced into a position where it extends through the plane of that portion of the flexible material seated against the projection 108. By subsequently withdrawing the pin 156 from the actuator's circular aperture 154, the force of the spring 138 will automatically return the actuator 110 and the strip of flexible material 132 to the positions shown in FIG. 5 wherein the flexible material seals the orifice 106. Interferences between the opening 142 of the flexible material 132 and the projection 108 during displacement of the flexible material is minimized by the tapered configuration of the opening's lateral sides 148 and 150.

Referring now to FIGS. 1, 3 and 8 of the drawings, it will be seen that the applicator system 88 further includes a generally "U"-shaped spring member 160. The base of this spring member 160 seats against a lip 162 extending across the outside face of the sidewall 104 and a section 164 of each leg of the spring member is seated against the sidewall 104 by a pair of "L"-shaped grips 166 extending from that wall. A section 168 of each leg of the spring member 160 is disposed in spaced relationship to the sidewall 104 and includes an offset 170 that seats against tang 118 when the actuator 110 is in its initial position as shown in FIGS. 1 and 5 of the drawings. In this condition, the strip of flexible material 132 is disposed intermediate the offsets 170. Pivotally disposed between the extremities of the U-shaped spring member 160 in alignment with the orifice 106 is a support plate 172. It will be seen from FIG. 1 that, when the actuator 110 is in its initial position with the orifice 106 sealed by the strip of flexible material 132, a section of film strip 20 disposed intermediate of the idlers 24 and 26 is positioned between and in spaced relationship to the support plate 172 and the strip of flexible material 132. However, when the actuator 110 is displaced along the guide tracks 112 and 114 into its position shown in FIG. 4 to bring the opening 142 of the strip of flexible material 132 into alignment with the orifice 106, the tang 118 will have been withdrawn from contact with the offsets 170 in the legs of the spring member 160 and the inherent force of the spring member will displace the support plate 172 into contact with the film strip 20 to slidably engage the film strip against that section of the flexible material 132 disposed across the projection 108. At such time as the actuator 110 is once again returned to its original position as shown in FIG. 5, the spring member 160 will be engaged by the actuator's tang 118 to displace the support plate 172 out of contact with the film strip 20 permitting the film strip to return to its original position in spaced relationship to both the support plate and the strip of flexible material 132. It will also be recognized that whenever the actuator 110 is displaced into a position such that the support plate 172 slidably engages the film strip 20 against the strip of flexible material 132, the cleaning pad 1152 automatically engages the strip of photographic material 20 immediately in front of the orifice 106.

The reels 16 and 18 are respectively provided with recesses 174 and 176 which are adapted to receive externally mounted drive means through apertures (not shown) appropriately provided in the cassette's wall 40. Thus, the cassette 10 includes means for reversibly transporting the film strip 20 between the supply reel 16 and the takeup reel 18 and across the orifice 106 of the applicator system 88 and the film gate 32. Consequently, the film gate 32 is adapted to serve as an exposure station during a first pass of the photosensitive film strip thereacross and as a projection station during subsequent operations in which the exposed film strip, in a fully processed condition, is advanced from the supply reel 16 to the takeup reel 18.

Idler 26, around which the film strip 20 passes on its way from the supply reel 16 to the film gate 32 may, if desired, be mounted on a movable post spring biased towards the corner which it occupies in the housing of the cassette 10 and capable of being moved resiliently inwardly away from that corner. Also, idler 28 may be spring biased toward the corner which it occupies in the housing of the cassette 10 and capable of being moved resiliently inwardly away from that corner. This represents one way to minimize strain exerted on the film strip 20 by the conventional intermittent film advancement structure engaging the sprocket holes of the film during exposure and projection operations.

As indicated, the cassette 10 is initially furnished with substantially all of the film strip 20 in a photosensitive condition coiled on the supply reel 16. For exposure purposes, the cassette 10 is mounted in an appropriate camera (not shown) with the drive means of the camera engaging the recess 176 of the takeup reel 18. While the particular camera employed does not form part of the present invention, it may advantageously take the form of the camera described in the hereinbefore mentioned application Ser. No. 813,427 of Rogers B. Downey, filed Apr. 4, 1969. The camera described in that application includes a door mounted pin which automatically enters the cassette 10 through its aperture 70 to snub the idlers 28 and 30 whenever the cassette is mounted therein. In any case, in this use of light rays from the scene being photographed are focused by the camera lens through the camera shutter and the film gate 132 onto the photosensitive film strip 20 in its passage from the supply reel 16 to the takeup reel 18. During this exposure sequence, the processing fluid 94 is retained within the collapsible pod or container 76, the actuator 110 is in its position as shown in FIG. 15 wherein the orifice 106 is sealed by the strip of flexible material 132 under the force of the spring 138 and the film strip 20 passes between and in spaced relationship to the support plate 172 and the strip of flexible material 132. As the film strip 20 is drawn onto the takeup reel 18 by power supplied thereto by the camera, it is simultaneously advanced past the film gate 32 in incremental steps by a typical claw mechanism or the like of the camera cooperating with the sprocket holes 60 provided in the film strip 20. During this operation, the opening or film gate 32 provided by the aforementioned cut out portions of the cassette defines a station providing access of light to selective incremental portions of the film strip 20. In this respect, if desirable, the cassette 10 may include still an additional aperture and conventional means (not shown) for receiving the camera's claw mechanism and cooperating therewith so that the claw mechanism, at the proper time, advances the film strip 20 across the film gate 32 in incremental steps. In the embodiment illustrated, the photosensitive surface of the film strip 20 faces inwardly of the cassette 10 such that exposure of the photosensitive emulsion is effected through the transparent film base.

Figure 6:
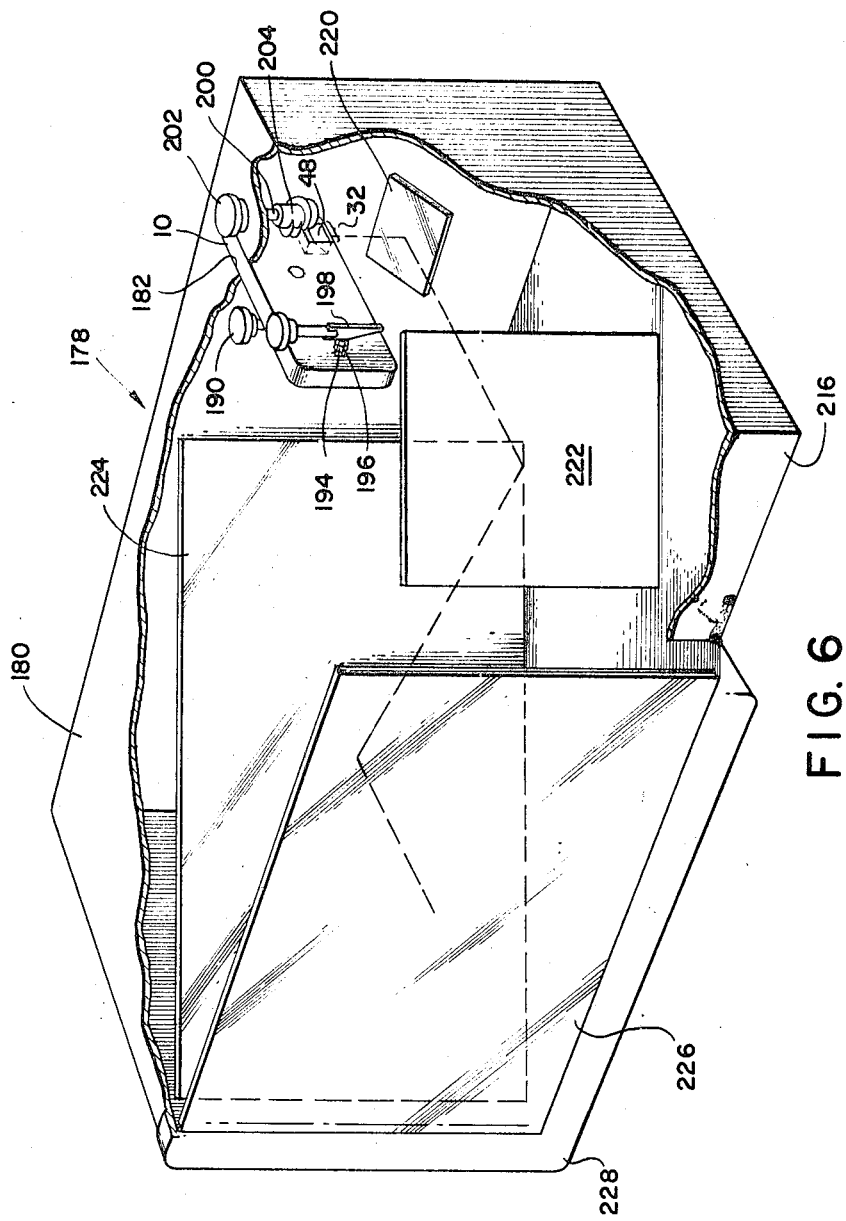
FIG. 6 is a diagrammatic cut away perspective view of a processor-projector unit adapted to receive the film-handling cassette shown in FIG. 1 and embodying features of this invention.

While the exposed film strip 20 may be processed with the cassette 10 mounted in the camera or when it is mounted in a special processing apparatus, it is preferably processed while the cassette 10 is mounted in a special processor-projector unit 178 diagrammatically illustrated in FIG. 6 of the drawings. In this connection, the top panel 180 of the processor-projector unit 178 is provided with a slot 182 configured to receive the cassette 10. Prior to inserting the cassette 10 into the processor-projector unit 178, its plate 14 should be removed to expose the rupturable processing fluid containing pod 76 and the fluid feeding device 80. It will be seen from FIG. 3 of the drawings that the removable plate 14 seats in grooves 184 suitably provided in portions of the frame member 12. This removable plate 14 serves to protect the pod 76 prior to the processing operation and is made of any suitable material, such as a thin sheet of aluminum, which can be readily slidably removed from the grooves 184 and reinserted thereinto.

A preferred embodiment of the pod rupturing means of the processor-projector unit 178 is diagrammatically illustrated in FIGS. 7 and 9 of the drawings. As shown therein, a support member 185 is mounted from, and slidably disposed along, guide tracks 186 and 187 of the processor-projector unit 178. Connected to the support member 185 is a bracket 188 which rotatably supports a roller 189. This roller 189, or at least its peripheral surface, is preferably formed of rubber. A pin 190 extends through a slot 191 provided in the top panel 180 of the unit 178 and thence through a bore 192 of the support member 185. Mounted on the end of the pin 190 extending exteriorly of the panel 180 is a hand knob 193 which includes a reduced stem portion 195 adapted to seat in an annular recess 197 provided in the top panel in communication with the slot 191. A spring 199, mounted on the end of the pin 190 positioned internally of the processor-projector unit 178 and connected to the support member 185, continually urges the pin and the hand knob 193 attached thereto inwardly of the unit 178. A second spring 201 connected to the support plate 185 continually urges the support plate in a left-handed direction along the guide tracks 186 and 187 as viewed in FIGS. 7 and 9. Thus, when the roller 189 is in the position shown in the drawings wherein it extends a slight distance into the slot 182, the reduced stem portion 195 of the hand knob 193 seats in the recess 197 under the force of the spring 186. It will thus be recognized that, with the roller 189 in the position shown in those figures of the drawings, the leading edge of the fluid containing pod 76 furthest removed from the fluid feeding device 80 will be first contacted by the roller as the cassette 10, less its plate 14, is inserted into the slot 182. Thence, in the course of completing the insertion of the cassette 10 into the processor-projector unit 178, the roller 189 exerts a compressive force progressively along the entire length of the assembly comprising the collapsible pod 76 and the fluid feeding device 80. This compressive force first causes the pod's weakened seal 78 to rupture and then the processing fluid 94 to be expelled therefrom through the fluid feeding device 80 into the reservoir chamber 84 of the applicator system 88. It will also be appreciated that, with the hand knob 193 withdrawn from the recess 197 and displaced to its furthermost left hand direction along the slot 188 as viewed in FIG. 7, under the force of the spring 201, a cassette 10 including its removable plate 14 may be inserted into the slot 182 free of any interference from the roller 189.

A pin 194 (See FIG. 6) of the processor-projector unit 178 is positioned to be in alignment with the cassette's aperture 70 once the cassette has been fully inserted into that unit. A spring 196 mounted on the pin 194 continually urges that pin in a direction away from the cassette 10. However, a tapered arm 198 slidably mounted within the processor-projector unit 178 and extending through that unit's top panel 180 contacts the pin 194 to restrain its movement away from the cassette 10. This arrangement permits the operator to manipulate the arm 198 to selectively drive the pin 194 internally of the cassette 10 against the resilient member 62 to effect a snubbing of the idlers 28 and 30.

Returning again to FIG. 7 of the drawings, a pin 200 is journaled through the top panel 180 of the processor-projector unit 178 and a hand knob 202 is mounted on the end of that pin extending externally of the unit 178. A cam track member 204 is mounted on the other end of the pin 200 and its cam track 206 is adapted to receive one end 208 of a pin 156. This pin 156 is connected to a leaf spring 210 and is slidably disposed along a slot 212 of that element. It will be noted that the slot 212 is positioned adjacent one end of the leaf spring 210 while the other end of that member is affixed to the housing of the processor-projector unit 178. The force of the spring 210 continually urges the pin 156 away from the cassette 10 so that its end 208 is seated in the cam track 206. When the pin 156 is in its lowermost position along the spring 210 as viewed in FIG. 7, its other end 214 is aligned with the cassette's elongated slot 158 and is thus adapted to be seated in the circular aperture 154 of the actuator 110. The cam track 206 is specially configured so that, with the cassette 10 mounted in the unit 178, the first 90° rotation of the hand knob 202 in a counterclockwise direction will effect a displacement of the pin 156 inwardly of the cassette 10 whereby its end 214 seats in the actuator's circular aperture 154. Completion of a 360° counterclockwise rotation of the hand knob 202 drives the pin 156 upwardly along the slot 212 of the leaf spring 210 to effect a displacement of the actuator 110 from its position shown in FIG. 5 of the drawings to its position illustrated in FIG. 4. It will be recalled that, in the course of displacing the actuator 110 against the force of the spring 138, the support plate 172 slidably engages the film strip 20 against the strip of flexible material 132 over the orifice 106.

After the cassette 10 has been fully inserted into the unit 178, drive shafts (not shown) of that unit engage the fluid recesses 174 and 176 of the supply reel 16 and the takeup reel 18, respectively. These shafts are connected in a conventional manner to a motor (not shown) of the unit 178 in order to facilitate selective reversible transport of the film strip 20 between the supply reel 16 and the takeup reel 18. As is conventional, the drive shaft which engages the takeup reel 18 is connected to that motor through a friction clutching arrangement. Appropriate switches (not shown) for selectively energizing the cassette's supply reel 16 and takeup reel 18 are conveniently located on a control panel 216 of the processor-projector unit 178.

The processor-projector unit 178 also includes other conventional elements, e.g., an intermittent film advancement mechanism, a light source, a shutter mechanism and a lens system. The light source 218 of the processor-projector unit 178 is diagrammatically illustrated in FIG. 2 and is positioned such that its light rays are directed through the concave light receiving transparent face 50 of the light receiving element 48 when the cassette 10 is mounted in the processor-projector unit. Operation of this light source 218 is controlled by a button (not shown) positioned on the control panel 216. Once the film strip 20 has been processed, the light source 218 can be energized and its light rays will be redirected by the cassette's light reflecting element 48 outwardly of the cassette through the film strip 20 and the film gate 32. These now image-carrying light rays are then further redirected by a plurality of mirrors 220, 222 and 224 and focused by the projector's lens system onto a viewing screen 226 mounted in the front panel 228 of the processor-projector 178.

OPERATION OF THE PREFERRED EMBODIMENT

To summarize the operation of the preferred embodiment of this invention, the cassette 10 with its film strip 20 in an unexposed condition and substantially entirely coiled on the supply reel 16 and with its processing fluid 94 retained within the rupturable container 76 is adapted to be quick mounted in a camera (not shown). As previously explained, at this time the actuator 110 is positioned as shown in FIG. 5 of the drawings under the force exerted on it by the spring 138 through the strip of flexible material 132. The camera includes a friction clutched drive shaft which engages the recess 176 of the takeup reel 18 and which can be selectively energized by the camera's motor to advance the film strip 20 from the supply reel 16 onto the takeup reel 18. During this process, the claw mechanism of the camera engages the sprocket holes 60 of the film strip 20 to draw the film strip in incremental steps across the film gate 32 for exposure purposes. In this manner, the operator can selectively record images on the photosensitive film strip 20 as it traverses the film gate 32. After the film strip 20 has been completely exposed, the cassette 10 can be quickly removed from the camera and replaced, when desired, by an identical cassette containing unexposed film.

Prior to inserting the cassette 10 into the processor-projecting unit 178, its plate 14 should be removed, and hand knob 193 of the unit 178 displaced along the slot 191 to its furthermost right-hand position as viewed in FIG. 7 of the drawings and the tapered arm 198 displaced to its uppermost position as viewed in FIG. 6. Also, at the time the cassette 10 is inserted into the processor-projector unit 178, the hand knob 202 of that unit should be in its position as shown in FIG. 7 wherein the pin 156 is in its furthermost right-hand position. As the cassette 10 enters the slot 182, its rupturable pod 76 and then its fluid feeding device 80 are progressively engaged by the roller 189. This insertion process, as previously explained, causes the processing fluid 94 to be expelled from the pod 76 through the fluid feeding device 80 into the reservoir chamber 84 of the applicator system 88. Additionally, after the cassette 10 has been fully inserted into the processor-projector unit 178, the aforementioned drive shafts of that unit engage the fluted recesses 174 and 176 of the cassette's supply and takeup reels 16 and 18, respectively.

The operator may now turn the hand knob 202 360° in a counterclockwise direction as viewed in FIGS. 6 and 7 to seat the pin 156 into the circular aperture 154 of the applicator system's actuator 110 and to displace that actuator from its position as shown in FIG. 5 to its position shown in FIG. 4. In the course of this operation, the support plate 172 slidably engages the strip of photographic material 20 against the flexible material 132 over the orifice 106, which orifice is now in an unsealed condition.

Additionally, this counterclockwise rotation of the hand knob 202 displaces the cleaning pad 152 into contact with the film strip 20 adjacent the orifice 106 (See FIG. 8).

By then turning an appropriate switch located on the control panel 216 of the processor-projector unit 178, the exposed strip of material 20 is returned from the takeup reel 18 to the supply reel 16. During this sequence, the exposed photographic film strip 20 passes across the orifice 106 and draws processing fluid 94 from the applicator system's reservoir chamber 84 to form a uniform fluid coating along its entire length. Any foreign particles on the surface of the film strips 20 are removed by the cleaning pad 152 immediately prior to the surface being treated with the processing fluid 94. It will further be noted that, with the cassette 10 inserted into the unit 178, the orifice 106 is disposed adjacent the lowermost portion of the reservoir chamber 84 and the force of gravity causes processing fluid 94 to be continually fed from the reservoir chamber through that orifice onto the film strip 20. It will also be recalled that the actuator's prong 118 is spaced a shorter distance from the sidewall 104 of the applicator's housing member 95 than is the end face 122 of the rectangular projection 108. Consequently, the strip of flexible material 132 is disposed out of contact with the film strip 20 intermediate the projection 108 and the prong 118. This unique arrangement permits the film strip 20 to draw processing fluid 94 from the orifice 106. In this connection, reference is made to FIG. 8 which depicts the orientation of the strip of flexible material 132, the opening 142 therein, the doctor blade 111 and the exposed film strip 20 at the time the film strip is slidably engaged against the flexible material by the support plate 172. It will be seen from this particular figure of the drawings, that the thickness of the coating of the processing fluid 94 applied to the film strip 20 is a function of the thickness of the strip of flexible material 132.

The motor of the processor-projector unit 178 is automatically deenergized by conventional means (not shown) as soon as the entire length of exposed film strip 20 has been drawn across the orifice 106 onto the supply reel 16. At this time, the orifice 106 should once again be sealed. Also, at this time the support plate 172 should be returned to its original position to permit the film strip 20 to return to a position where it is disposed out of contact with both the support plate and the strip of flexible material 132. These operations are accomplished by rotating the hand knob 202 in a clockwise direction until it has reached its original position (See FIG. 7). Thus, the actuator 110 is returned to its position as shown in FIG. 5 and the pin 156 is withdrawn from the cassette 10. Additionally, the operator should displace the tapered arm 189 inwardly of the processor-projector unit 178 to effect a snubbing of the idlers 28 and 30.

By then turning a second switch (not shown) mounted on the control panel 216, the light source 218 of the processor-projector unit 178 and that unit's motor are simultaneously energized, in this instance, the motor driving both the intermittent film advancement mechanism of the unit 178 and the takeup reel 18 of the cassette 10. As the now fully processed film strip 20 is once again drawn across the film gate 32 onto the takeup reel 18 visible images contained thereon are projected onto the screen 226 for viewing purposes. Again, conventional means (not shown) automatically deenergized the light source 218 and the motor of the unit 178 once the entire processed film strip 20 has been projected.

The roller 189 is preferably returned to its original position within the processor-projector unit 178 prior to removing the cassette 10 from the slot 182. This is accomplished by withdrawing the hand knob 193 from the recess 197 to permit the spring 199 to urge the support member 185 to its furthermost left-hand position as viewed in FIG. 7 of the drawings. Also preferably, the film strip 20 is returned from the takeup reel 18 to the supply reel 16 before removing the cassette 10 from the processor-projector unit 178. Once the cassette 10 has been removed from that unit 178, its plate 14 should be replaced. In this condition, the cassette 10 may be conveniently stored until it is again desired to view the developed film strip 20 contained therein. Later insertions of the cassette 10 containing the developed film strip 20 into the processor-projector unit 178 to facilitate subsequent viewings are preferably effected with the cassette's removable plate 14 in place and the roller 189 located in its last-stated position.

Editing of the developed film strip 20 can easily be effected. It is only necessary to draw a loop of the film strip 20 from the film gate 32 and to remove sections therefrom and to splice sections thereinto as desired.

Those familiar with the motion picture arts will readily appreciate the novel and highly unique advantages of this invention. An inexpensive and efficient system is provided for uniformly coating a strip of exposed photographic material with processing fluid. Importantly, this system assures that there will be no desirable leakage of processing fluid either prior or subsequent to the application of that fluid to the exposed film strip and, further, assures that the processing fluid will be applied to an impurity-free film strip surface. This unique system is particularly well adapted for incorporation into a compact multipurpose motion picture film handling cassette to greatly simplify the task of the photographer and to permit him to quickly develop his own pictures in a unique processor-projector unit.

The term "projector" is used herein in a comprehensive sense, i.e., to broadly refer to those systems wherein the visible images recorded on a sheet of material are reimaged for viewing purposes and is not restricted to only those systems in which the recorded visible images are projected onto a screen of one type or another.

This invention may be practiced or embodied in still other ways without departing from the spirit of essential character thereof. For instance, in some applications it may very well prove desirable to mount the spring 138 to the housing member 95 of the applicator system 88 rather than from the housing of the cassette. Also a spring 138 may be employed of insufficient force by itself to return the actuator 110 from its position shown in FIG. 4 to that shown in FIG. 5, since the displacement of the pin 156 can exert the necessary force on the actuator to effect such a displacement thereof. The preferred embodiment described herein is therefore illustrative and not restrictive, the scope of the invention being indicated by the appended claims and all variations which come within the meaning of the claims are intended to be embraced therein.

What is claimed is:

1. A system for applying a coating of processing fluid to a strip of exposed photographic material comprising:
   a dispensing container in which such processing fluid may be retained and having an orifice through which such processing fluid may be expressed;
   first means for transversely advancing progressive sections of such strip of exposed photographic material into alignment with said orifice;
   second means slidably interposed between said orifice and such strip of exposed photographic material for selectively sealing and unsealing said orifice and for controlling the thickness of the coating of such fluid applied to such strip of exposed photographic material when said second means is in its unsealing relationship with respect to said orifice and such strip of exposed photographic material is seated against said second means; and
   third means for slidably seating progressive sections of such strip of exposed photographic material disposed in alignment with said orifice against said second means.

2. The system of claim 1 wherein said second means comprises a strip of flexible material having an opening provided therethrough, said opening being disposed to be in alignment with said orifice when said second means is in an unsealing relationship to said orifice and out of alignment with said orifice when said second means is in a sealing relationship to said orifice.

3. A system for applying a coating of processing fluid to a strip of exposed photographic material comprising:
a dispensing container in which such processing fluid may be retained and having an orifice of a fixed given size and shape through which such processing fluid may be expressed therefrom;
means for initially positioning a section of such strip of exposed photographic material in alignment with said orifice and spaced apart therefrom;
means for selectively sealing and unsealing said orifice, said sealing and unsealing means including a member mounted for displacement across said orifice;
means for progressively advancing such strip of exposed photographic material along a path transverse said orifice when said orifice is unsealed; and
means for displacing such strip of material from its initial position spaced apart from said orifice into operative relationship with said orifice as such strip of exposed photographic material is progressively advanced across said orifice and said orifice is unsealed, said displacing means serving to automatically bring the section of such strip of photographic material aligned with said orifice into operable relationship with said orifice whenever said orifice is unsealed and to automatically facilitate the return of the section of such strip of photographic material aligned with said orifice to a position out of operable relationship with said orifice when said orifice is sealed, whereby such processing fluid may be expressed from said container onto such strip of exposed photographic material to form a fluid coating along substantially its entire length.

4. The system of claim 3 wherein said orifice sealing and unsealing means controls the thickness of the coating of such processing fluid applied to such strip of photographic material.

5. A system for applying a coating of processing fluid to a strip of exposed photographic material comprising:
a dispensing container in which such processing fluid may be retained and having an orifice through which such processing fluid may be expressed therefrom;
first means for effecting relative motion between said orifice and progressive sections of such strip of exposed photographic material in alignment therewith;
second means, disposed across said orifice intermediate said orifice and the section of such strip of exposed photographic material in alignment therewith and mounted with respect to said container for relative slidable movement across said orifice, for sealing said orifice when in a first position with respect thereto and for unsealing said orifice when in a second position with respect thereto; and
third means for effecting slidable engagement between the section of such strip of exposed photographic material disposed in alignment with said orifice and the section of said second means disposed across said orifice when said second means is in its second position, whereby such producing fluid may be expressed from said container onto such strip of exposed photographic material to form a fluid coating therealong when said second means is in its said second position.

6. A system for applying a coating of processing fluid to a strip of exposed photographic material comprising:
a dispensing container in which such processing fluid may be retained and having an orifice through which such processing fluid may be expressed therefrom;
first means for progressively advancing such strip of exposed photographic material across said orifice;
second means slidably disposed across said orifice intermediate said orifice and the section of such strip of photographic material in alignment therewith, for sealing said orifice when in a first position with respect thereto and for unsealing said orifice when in a second position with respect thereto; and
third means for effecting slidable engagement between the section of such strip of exposed photographic material disposed in alignment with said orifice and the section of said second means disposed across said orifice when said second means is in its said second position, whereby such processing fluid may be expressed from said container onto such strip of exposed photographic material to form a fluid coating therealong when said second means is in its said second position.

7. The system of claim 6 wherein such strip of exposed photographic material is disposed in spaced relationship to said second means when said second means is in its said first position.

8. The system of claim 7 wherein said third means comprises a spring extending from said container and a support plate connected to said spring in alignment with said orifice on the opposite side of such strip of exposed photographic material from said orifice.

9. The system of claim 8 wherein said third means includes an actuator connected to said second means and mounted to engage said spring whereby said actuator restrains displacement of said support plate towards said orifice when said second means is in its said first position and said actuator may be moved to simultaneously displace said second means from its said first position to its said second position and to permit said spring to urge said support plate towards said orifice to slidably engage such strip of unexposed photographic material against said second means when said second means is in its said second position.

10. The system of claim 6 wherein said second means comprises a strip of flexible material slidably disposed across said orifice.

11. A system for applying a coating of a processing fluid to a strip of exposed photographic material comprising:
a dispensing container in which such processing fluid may be retained and including a projection defining an orifice through which such processing fluid may be expressed therefrom;
first means for progressively advancing such strip of exposed photographic material across said orifice;
second means including a strip of flexible material slidably disposed across said orifice intermediate said orifice and the section of such strip of photographic material in alignment therewith, for sealing said orifice when in a first position with respect thereto and for unsealing said orifice when in a second position with respect thereto; and
third means for effecting slidable engagement between the section of such strip of exposed photographic material disposed in alignment with said orifice and the section of said strip of flexible material disposed across said orifice when said strip of flexible material is in its second position, said strip of flexible material turning inwardly towards said container on one side of said projection at least when such strip of flexible material is in its second position and having an opening located therethrough to be disposed out of alignment with said orifice when in its said first position so that said orifice is sealed by said strip of flexible material and to be disposed in alignment with said orifice when in its said second position so that processing fluid retained in said container may be expressed through said orifice, said opening being of sufficient size to extend beyond said one side of said projection when said strip of flexible material is in its second position, whereby such processing fluid may be expressed from said container onto such strip of exposed photographic material to form a fluid coating therealong when said strip of flexible material is in its said second position.

12. The system of claim 11 wherein said third means includes an actuator to which one end of said strip of flexible material is connected and additionally comprising biasing means connected to the other end of said strip of flexible material for continually urging said strip of flexible material towards its said first position.

13. The system of claim 12 additionally comprising means for directing said strip of flexible material inwardly towards said container from the plane of the section thereof disposed across said projection on the other side of said projection from said one end of said strip of flexible material and a cleaning pad mounted on said strip of flexible material adjacent said opening on the side thereof furthest removed from said one end of said strip of flexible material, whereby said cleaning pad is disposed out of the plane of the section of such photographic material in alignment with said orifice when said strip of flexible material is in its said first position and said cleaning pad extends into said plane when said strip of flexible material is in its said second position.

14. An applicator system useful in applying a coating of processing fluid to a strip of exposed photographic material comprising:
a housing defining a reservoir chamber in which such processing fluid may be retained and having means defining an orifice through which such processing fluid may be expressed therefrom;
a strip of flexible material slidably seated across the end face of the peripheral edges of said orifice for movement from a first position to a second position and directed inwardly towards said housing on one side of said orifice at least when in its said second position, said strip of flexible material having an opening located therethrough to be disposed out of alignment with said orifice when in its said first position so that said orifice is sealed by said strip of flexible material and to be disposed in alignment with said orifice when in its said second position so that such processing fluid retained in said reservoir area may be expressed through said orifice, said opening being of sufficient size to extend beyond said one side of said orifice when said strip of flexible material is in its said second position; and
means for selectively slidably displacing said strip of flexible material from its said first position to its said second position, whereby when said flexible material is in its said second position, a section of such strip of photographic material may be seated against the section of said flexible material disposed across said end face of the peripheral edges of said orifice and relative motion of such strip of exposed photographic material across said section of said flexible material thereafter in a direction towards said one side of said orifice from said orifice facilitates the expression of such processing fluid through said orifice to form a coating thereof along such strip of photographic material.

15. The applicator system of claim 14 wherein said orifice is rectangular in configuration and said opening includes a pair of parallel sides disposed lengthwise along said strip of flexible material, said parallel sides of said opening being aligned with a pair of opposed sides of said orifice when said strip of flexible material is in its said second position.

16. The applicator system of claim 15 wherein said opening additionally includes a pair of lateral sides connecting adjacent ends of said parallel sides thereof, said lateral sides tapering outwardly away from said adjacent ends of said parallel sides of said opening to a point intermediate said parallel sides, whereby interference between said lateral sides of said opening and said peripheral edges of said orifice is minimized as such strip of flexible material slides across said end face of said peripheral edges of said orifice responsive to said means for displacing such strip of flexible material.

17. The applicator system of claim 15 additionally comprising a cleaning pad mounted across said strip of flexible material adjacent said opening on the opposite side thereof from that portion thereof adapted to extend beyond said one side of said orifice inwardly towards said housing when said strip of flexible material is in its said second position, whereby said relative motion will result in such exposed strip of photographic material contacting said pad immediately prior to being treated with said processing fluid.

18. The applicator system of claim 17 additionally comprising means for directing said strip of flexible material inwardly of said housing out of the plane of said section thereof seated across said orifice on the other side of said orifice from said one side thereof, whereby said cleaning pad is disposed out of the plane of said section of said flexible material seated across said orifice when said flexible material is in its said first position and extends through said plane when said flexible material is in its said second position.

19. The applicator system of claim 14 where said strip of flexible material is formed of a material selected from the group consisting of polymeric material and sheet metal.

20. The applicator system of claim 18 wherein said strip of flexible material is formed of a material selected from the group consisting of polymeric material and sheet metal.

21. The applicator system of claim 14 wherein said means for displacing said strip of flexible material includes an actuator and guide means associated with said housing for slidably receiving said actuator.

22. The applicator system of claim 14 wherein said housing includes a pair of opposed walls interconnected by a sidewall, said orifice is located in said sidewall and said means for displacing said strip of flexible material comprises an actuator and guide tracks associated with one of said opposed walls for slidably receiving said actuator.

23. The applicator system of claim 22 wherein said actuator comprises a prong extending across said sidewall and placed in closer relationship to said sidewall than said end face of the peripheral edges of said orifice and to which one end of said strip of flexible material is connected.

24. The applicator system of claim 22 wherein said guide tracks are formed in the outside face of said one of said opposed walls and said actuator includes an integrally formed spring member adapted to be engaged by an externally mounted member to firmly seat said actuator in said guide tracks.

25. The applicator system of claim 14 wherein one end of said strip of flexible material is connected to said means for displacing said strip of flexible material and additionally including biasing means connected to the other end of said strip of flexible material for continually urging said strip of flexible material towards its said first position.

26. The applicator system of claim 23 additionally including biasing means connected to the other end of said strip of flexible material for continually urging said strip of material into its said first position.

27. The applicator system of claim 14 additionally comprising a pair of shoulders extending from said housing adjacent respective sides of said strip of flexible material so as to restrain lateral movement of said strip of flexible material.

28. The applicator system of claim 22 additionally comprising a pair of shoulders extending from said sidewall adjacent respective sides of said strip of flexible material so as to restrain lateral movement of said strip of flexible material.

29. The applicator system of claim 14 additionally comprising a support plate disposed on the other side of said strip of flexible material from said orifice and initially spaced from said strip of flexible material, whereby such strip of photographic material may be progressively advanced between and in spaced relationship to said strip of flexible material and said support plate, when said strip of flexible material is in its said first position, and means for effecting relative movement between said support plate and said housing towards each other when said strip of flexible material is in its said second position whereby such photographic material is slidably engaged against said flexible material by said support plate.

30. The applicator system of claim 29 wherein said means for effecting relative movement of said support plate and said housing includes a spring mounted on said housing and connected to said support plate.

31. The applicator system of claim 30 wherein said means for effecting relative movement of said support plate and said housing additionally includes a member adapted to engage said spring and actuated by said means for displacing said strip of flexible material.

32. The applicator system of claim 31 wherein said spring is generally U-shaped and its base is mounted on said housing and said support plate is pivotably mounted intermediate its open ends.

33. The applicator system of claim 32 additionally including a spring mounted from said sidewall and a support plate connected to said spring in alignment with said orifice, the inherent force of said spring continually urging said support plate towards said orifice, said prong contacting said spring to restrain said support plate in spaced relationship to said strip of flexible material when in its said first position and removed from contact with said spring to permit said spring to displace said support plate from said spaced relationship to said strip of flexible material towards said strip of flexible material when said prong is in its said second position.

34. An applicator system useful in applying a coating of processing fluid to a strip of exposed photographic material comprising:
a pair of opposed walls;
a sidewall extending adjacent the peripheral edges of said opposed walls and connected thereto to define a reservoir chamber in which such processing fluid may be disposed, said opposed walls and said sidewall being configured to provide a substantially planar section along the length of said sidewall, said section having a rectangular orifice provided therethrough with two parallel sides of said orifice extending lengthwise along said section;
a projection extending from said sidewall along the periphery of said orifice;
a pair of guide tracks associated with the outside face of one of said opposed walls and disposed in parallel relationship to said planar section of said sidewall;
an actuator slidably disposed in said guide tracks including a prong extending over the face of said planar section of said sidewall and spaced therefrom a distance less than the end face of said projection, said actuator adapted to being displaced along said guide tracks to facilitate the movement of said prong from a first position with respect to said orifice to a second position disposed a greater distance from said orifice; and
a strip of flexible material disposed over said end face of said projection and having one of its ends connected to said prong and its other end biased in a direction away from said prong whereby said strip of flexible material continually urges said prong towards said orifice, said strip of flexible material having an opening provided therethrough and located therein to be in registry with said orifice when said prong is in its second position and out of registry with said orifice when said prong is in its said first position at which time said orifice is sealed by strip of flexible material, said opening being of sufficient size to extend beyond the side of said projection most closely adjacent said prong when said prong is in its said second position.

35. A compact multipurpose motion picture film handling cassette comprising:
an enclosed opaque housing configured to be mounted in a camera to facilitate film exposure operations and then in a second photographic apparatus to facilitate film processing operations;
a film gate for access of image carrying light rays into said opaque housing;
a dispensing container mounted within said opaque housing in which processing fluid may be retained and having an orifice through which such processing fluid may be expressed therefrom;
an unexposed photographic film strip coiled at an initial position within said opaque housing;
means responsive to drive means of such camera and apparatus for advancing said film strip within said opaque housing and for returning said film strip to its initial position, whereby said unexposed film strip may be first progressively brought into operative relationship to said film gate for exposure purposes and subsequently, in an exposed condition, progressively passed across said orifice; and
means for selectively sealing and unsealing said orifice whereby, after said film strip has been exposed to said image carrying light rays to record images thereon and said orifice is unsealed, such processing fluid may be expressed from said container to form a fluid coating therealong.

36. A compact multipurpose motion picture film handling cassette comprising:
an enclosed opaque housing configured to be mounted in a camera to facilitate film exposure operations and then in a second photographic apparatus to facilitate film-processing operations;
an unexposed photographic film strip coiled at an initial position within said opaque housing;
a film gate for access of light to selective incremental portions of said film strip;
a second housing mounted within said opaque housing defining a reservoir chamber in which processing fluid may be retained and having an orifice through which such processing fluid may be expressed therefrom;
first means responsive to drive means of such camera and such apparatus for progressively transporting said film strip within said opaque housing into operative relationship with said film gate for exposure purposes and across said orifice for processing purposes;
second means slidably disposed across said orifice intermediate said orifice and the section of said film strip in alignment therewith for sealing said orifice when in a first position with respect thereto and for unsealing said orifice when in a second position with respect thereto; and
third means for effecting slidable engagement between said section of said film strip disposed in alignment with said orifice and the section of said second means disposed across said orifice when said second means is in its said second position, whereby such processing fluid may be expressed from said reservoir chamber onto said film strip to form a fluid coating therealong after said film strip has been exposed to image carrying light rays during advancement thereof in operative relationship to said film gate.

37. A cassette comprising:
an enclosed opaque housing;
an unexposed photographic strip coiled at an initial position within said opaque housing;
a film gate for access of light to selective incremental portions of said film strip;
a second housing mounted within said opaque housing defining a reservoir chamber in which processing fluid may be retained and having an orifice through which such processing fluid may be expressed therefrom;
first means for advancing said film strip within said opaque housing and for returning said film strip to its initial position, whereby said film strip may be selectively progressively transported into operative relationship with said film gate and across said orifice;
second means slidably disposed across said orifice intermediate said orifice and the section of said film strip in alignment therewith for sealing said orifice when in a first position with respect thereto and for unsealing said orifice when in a second position with respect thereto;
third means for effecting slidable engagement between said section of said film strip disposed in alignment with said orifice and the section of said second means disposed across said orifice when said second means is in its said second position; and an actuator connected to said second means and mounted for slidable motion with respect to said second housing and adapted to be engaged by an externally mounted force-applying member, said enclosed opaque housing having a slot provided therethrough adapted to receive such externally mounted force applying member into engagement with said actuator, whereby such processing fluid may be expressed from said reservoir chamber onto said film strip to form a fluid coating therealong after said film strip has been exposed to image carrying light rays during advancement thereof in operative relationship to said film gate.

38. The cassette of claim 37 wherein said second means includes a strip of flexible material slidably disposed across said orifice.

39. The cassette of claim 38 wherein an opening is provided through said strip of flexible material and is located therein to be positioned out of alignment with said orifice when said strip of flexible material is in its said first position and to be positioned in alignment with said orifice when said strip of flexible material is in its said second position.

40. A motion picture film handling system comprising:
a cassette including:
an enclosed opaque housing;
a film gate for access of image carrying light rays into said opaque housing;
a dispensing container mounted within said opaque housing in which processing fluid may be retained and having an orifice through which such processing fluid may be expressed therefrom;
an unexposed photographic film strip coiled at an initial position within said opaque housing;
means adapted to be driven by externally mounted drive means for advancing said film strip within said opaque housing and for returning said film strip to its initial position; and
means for initially sealing and then unsealing said orifice; and
a processing unit including:
means for receiving said cassette; a force-applying member; and
means for introducing said force-applying member into such cassette to engage said sealing and unsealing means of said cassette and for displacing said sealing and unsealing means from its initial sealed relationship with said orifice into its unsealed relationship with said orifice; and
drive means adapted to engage said cassette film strip advancing means;
whereby, after said unexposed film strip has been exposed to such image carrying light rays, it may be progressively passed across said orifice when said orifice is in its unsealed condition to facilitate such processing fluid being expressed from said container to form a fluid coating along said exposed film strip.

41. Apparatus useful in processing a strip of exposed photographic material coiled in a film handling cassette, such cassette including a housing defining a reservoir chamber in which processing fluid may be retained and having an orifice through which such processing fluid may be expressed from such reservoir chamber, first means slidably displaced across such orifice for sealing such orifice when in a first position with respect thereto and for unsealing such orifice when in a second position with respect thereto, second means for progressively advancing such strip of exposed photographic material across such orifice when such first means is in its second position, an actuator adapted to be operably engaged by an externally mounted force-applying member and connected to such first means, and access means for receiving such force-applying member into such cassette into operable engagement with such actuator and for subsequently permitting displacement of such actuator from a first position wherein such first means is in its first position to a second position wherein such first means is in its second position, comprising:
means for receiving such cassette;
a force-applying member; and
means for introducing said force-applying member into such cassette through such access means into operable engagement with such actuator and for subsequently displacing said force-applying member whereby such first means of such cassette is moved from its first position to its second position.

42. The apparatus of claim 41 wherein said force-applying member includes a pin and said means for introducing said force-applying member into operable engagement with such actuator and for subsequently displacing said force-applying member includes a cam track adapted to receive one end of said pin.

43. Apparatus for processing a strip of exposed photographic material contained in a film handling cassette, such cassette including a collapsible container in which processing fluid is initially stored, such collapsible container having a weakened portion adapted to rupture when such fluid stored therein is subjected to predetermined pressure responsive to a force-applying member being pressed against such collapsible container, an applicator disposed in operative relationship to such strip of exposed photographic material and means for feeding such fluid to such applicator when such weakened portion of such collapsible container is ruptured, comprising:
means for receiving such cassette having a slot through which such cassette can be inserted into said apparatus;
a roller disposed within said apparatus adjacent said slot to initially contact the edge of such collapsible container furthermost removed from such weakened portion as such cassette is partially inserted into said cassette receiving means and to progressively apply a compressive force across said collapsible container from such edge thereof to such weakened portion in the process of completing the insertion of such cassette into said apparatus whereby such weakened portion is automatically ruptured and such fluid automatically expelled from such collapsible container in the process of inserting such cassette into said apparatus.

44. The apparatus of claim 43 wherein such cassette additionally includes a removable cover plate initially protecting such collapsible container and said apparatus additionally comprises means for selectively displacing said roller from its position adjacent said slot to a second position removed from said slot so that when said roller is in its said second position such cassette including its such cover plate may be inserted into said apparatus free from interference with said roller.

45. A compact multipurpose motion picture film handling cassette comprising:
a substantially enclosed opaque housing configured to be mounted in a camera to facilitate film exposure operations and then in a second photographic apparatus to facilitate film processing operations;
an unexposed photographic film strip stored within said housing;
a film gate for access of light to selective incremental portions of said film strip
first means within said housing for initially storing a quantity of processing fluid and for facilitating the expressing of such fluid therefrom, said first means including an orifice;
second means for progressively transporting said film strip within said housing across said film gate for exposure purposes responsive to drive means of such camera when said cassette is mounted in such camera and then across said orifice for processing purposes responsive to drive means of such second photographic apparatus when said cassette is mounted in such second photographic apparatus; and third means within said housing for selectively sealing said orifice so that said orifice may be sealed after said film strip has been treated with such fluid.

46. The cassette of claim 45 wherein said third means serves to control the thickness of fluid coating supplied to said film strip during film-processing operations.

47. A compact motion picture film handling cassette comprising:
a substantially enclosed opaque housing;
an unexposed photographic film strip stored within said opaque housing;
a film gate for access of light to selective incremental portions of said film strip;
a second housing mounted within said opaque housing defining a reservoir chamber in which processing fluid may be retained and having an orifice through which such processing fluid may be expressed therefrom;
first means for progressively transporting said film strip within said opaque housing into said operative relationship with said film gate for exposure purposes and across said orifice for processing purposes;
second means for sealing said orifice when in a first position with respect thereto intermediate said orifice and said film strip and for unsealing said orifice when in a second position with respect thereto intermediate said orifice and said film strip;
third means for effecting relative motion between said second housing and said second means to selectively effect at least the sealing of said orifice; and
fourth means for effecting slidable engagement of the section of said film strip disposed in alignment with said orifice and the section of said second means disposed adjacent said orifice when said second means is in its said second position with respect to said orifice, whereby such processing fluid may be expressed from said reservoir chamber onto said film strip to form a fluid coating therealong after said film strip has been exposed to image carrying light rays during advancement thereof in operative relationship to said film gate.

* * * * *